(12) United States Patent
Hub

(10) Patent No.: US 9,772,184 B2
(45) Date of Patent: Sep. 26, 2017

(54) VEHICLE CENTERING IN A CHASSIS ALIGNMENT STAND AND ASSOCIATED METHOD

(75) Inventor: Thomas Hub, Veitsbronn (DE)

(73) Assignee: Siemens Aktiengesellschaft, Munich (DE)

( * ) Notice: Subject to any disclaimer, the term of this patent is extended or adjusted under 35 U.S.C. 154(b) by 1865 days.

(21) Appl. No.: 12/812,182

(22) PCT Filed: Dec. 17, 2008

(86) PCT No.: PCT/EP2008/067749
§ 371 (c)(1),
(2), (4) Date: Jul. 8, 2010

(87) PCT Pub. No.: WO2009/087031
PCT Pub. Date: Jul. 16, 2009

(65) Prior Publication Data
US 2010/0292897 A1    Nov. 18, 2010

(30) Foreign Application Priority Data

Jan. 9, 2008    (EP) .................................... 08000302

(51) Int. Cl.
*G01B 21/26* (2006.01)
*G01M 17/007* (2006.01)
(52) U.S. Cl.
CPC ......... *G01B 21/26* (2013.01); *G01M 17/0074* (2013.01)
(58) Field of Classification Search
CPC ........... G01M 17/0074; G01M 17/022; G01M 17/0072; G01M 17/04; G01B 7/315; G01B 11/275; G01B 11/2755

USPC ...... 700/56, 279; 701/36, 41; 33/193, 203.8, 33/203.12, 203.13, 203.14, 371, 264, 286; 187/216; 73/11.08, 116.08, 117.07, 146, 73/865.9; 280/86.756; 29/407.08; 356/139.09
See application file for complete search history.

(56) References Cited

U.S. PATENT DOCUMENTS

| | | | | | |
|---|---|---|---|---|---|
| 4,002,051 | A | * | 1/1977 | Hilbrands | G01M 17/04 73/11.08 |
| 4,679,327 | A | * | 7/1987 | Fouchey et al. | 33/203.13 |
| 4,885,846 | A | * | 12/1989 | Nemeth et al. | 33/203.13 |
| 4,893,413 | A | * | 1/1990 | Merrill et al. | 33/371 |
| 4,901,442 | A | * | 2/1990 | Fujii | 33/203.13 |
| 4,901,560 | A | * | 2/1990 | Hirano et al. | 73/115.07 |

(Continued)

FOREIGN PATENT DOCUMENTS

| | | |
|---|---|---|
| DE | 201 05 929 | 8/2001 |
| WO | WO 00/60308 | 10/2000 |

OTHER PUBLICATIONS

Search Report and Written Opinion dated Oct. 5, 2010 issued in corresponding International Application No. PCT/EP2008/067749.

*Primary Examiner* — Yuri Kan
(74) *Attorney, Agent, or Firm* — Cozen O'Connor

(57) ABSTRACT

A device and method for centering a vehicle in a test stand having at least two pairs of rollers for supporting at least one of the front wheels and the rear wheels of the vehicle, and a measurement system. A controller is connected to the steering system of the vehicle, with which the steering angle of at least one of the front wheels and the rear wheels can be changed in accordance with data of the measurement system.

6 Claims, 2 Drawing Sheets

(56) References Cited

U.S. PATENT DOCUMENTS

| | | | | |
|---|---|---|---|---|
| 4,918,821 | A * | 4/1990 | Bjork | 33/203.18 |
| 5,027,275 | A * | 6/1991 | Sakamoto et al. | 701/36 |
| 5,040,303 | A * | 8/1991 | Koerner | G01B 7/315 33/203 |
| 5,105,546 | A * | 4/1992 | Weise et al. | 33/203.12 |
| 5,105,547 | A * | 4/1992 | Fujii | 33/203.13 |
| 5,111,585 | A * | 5/1992 | Kawashima et al. | 33/203.12 |
| 5,150,515 | A * | 9/1992 | Merrill et al. | 33/203.12 |
| 5,675,515 | A * | 10/1997 | January | 700/279 |
| 5,826,894 | A * | 10/1998 | McDonald et al. | 280/86.756 |
| 5,864,053 | A * | 1/1999 | Nozaki | 73/11.07 |
| 5,870,315 | A * | 2/1999 | January | 700/279 |
| 5,930,881 | A * | 8/1999 | Naruse et al. | 29/407.08 |
| 6,076,269 | A * | 6/2000 | Sekino et al. | 33/371 |
| 6,209,209 | B1 * | 4/2001 | Linson et al. | 33/203.12 |
| 6,374,159 | B1 * | 4/2002 | Naruse et al. | 700/279 |
| 6,404,486 | B1 * | 6/2002 | Nobis | G01B 11/2755 33/203.18 |
| 6,453,567 | B1 * | 9/2002 | Naruse | 33/203 |
| 6,498,959 | B1 * | 12/2002 | January et al. | 700/56 |
| 6,532,673 | B2 * | 3/2003 | Jahn et al. | 33/193 |
| 6,739,185 | B2 * | 5/2004 | Schoeninger | G01M 17/022 73/146 |
| 7,143,519 | B2 * | 12/2006 | Jackson | 33/203.12 |
| 7,254,995 | B2 * | 8/2007 | Leska et al. | 73/146 |
| 7,308,971 | B2 * | 12/2007 | Liebetreu et al. | 187/216 |
| 7,318,340 | B2 * | 1/2008 | Suita | 73/116.08 |
| 7,415,771 | B2 * | 8/2008 | Harrill | 33/264 |
| 7,472,485 | B2 * | 1/2009 | Gray et al. | 33/203.14 |
| 7,637,021 | B2 * | 12/2009 | Suita et al. | 33/203.12 |
| 2003/0131485 | A1 * | 7/2003 | Jahn | G01B 11/275 33/193 |
| 2003/0183023 | A1 * | 10/2003 | Kusters | G01M 17/0072 73/865.9 |
| 2010/0292897 | A1 * | 11/2010 | Hub | 701/41 |

\* cited by examiner

VEHICLE CENTERING IN A CHASSIS ALIGNMENT STAND AND ASSOCIATED METHOD

CROSS-REFERENCE TO RELATED APPLICATIONS

This is a U.S. national stage of International Application No. PCT/EP2008/067749, filed on Dec. 17, 2008. Priority is claimed on European Application No. EP08000302.3, filed on Jan. 9, 2008. The entire content of both applications are incorporated herein by reference.

BACKGROUND OF THE INVENTION

1. Field of the Invention

The invention relates to a device for centering a vehicle in a test stand that includes at least two pairs of rollers for the front wheels and/or the rear wheels, where at least one of the two rollers of each pair of rollers can be moved by motor about a longitudinal axis, and having a measurement system for measuring the position of the vehicle. The invention further relates to a method for centering a vehicle in a test stand, where the front wheels and/or the rear wheels each rest on a pair of rollers, one of the two rollers of the pair of rollers being moved by motor about the longitudinal axis.

2. Description of the Related Art

DE 201 05 929 U1 discloses a known device for positioning a vehicle in a chassis measuring stand. Here, the chassis measuring stand serves to measure and align the geometry of the axles for the wheels of the vehicle. The wheels can respectively be supported at least indirectly on two rollers, of which at least each one of the wheels can be moved by motor to rotate about the longitudinal axis of the roller. At least one roller of a wheel receptacle of at least one wheel of each axle of the vehicle can be driven by motor to position the vehicle in a lateral direction. Here, the wheel receptacle is supported in each case such that it can rotate about a fulcrum. Moreover, the wheel receptacle can respectively be positioned with reference to the wheel plane by a rotation about the fulcrum.

DE 201 05 929 U1 discloses a method for positioning a vehicle on a chassis measuring stand.

SUMMARY OF THE INVENTION

It is an object of the invention to provide a device that permits centering of a vehicle in a test stand in a simple way and with low outlay.

It is also an object of the invention to provide a method that permits the centering of the vehicle in the test stand in a simple way.

These and other objects and advantages are achieved in accordance with the invention by a controller that is coupled to the steering system of the vehicle and serves to vary the steering angle of the front wheels and/or of the rear wheels as a function of data of the measurement system.

The object is also achieved by a method having the following steps:
a) data relating to the position of the vehicle are measured with the aid of a measurement system; and
b) the steering angle of the front wheels and/or of the rear wheels, and thus the position of the vehicle, are varied with the aid of a controller coupled to the steering system of the vehicle.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the invention is explained in more detail below with the aid of the drawings, in which.

DETAILED DESCRIPTION OF THE PREFERRED EMBODIMENTS

Figure 1:
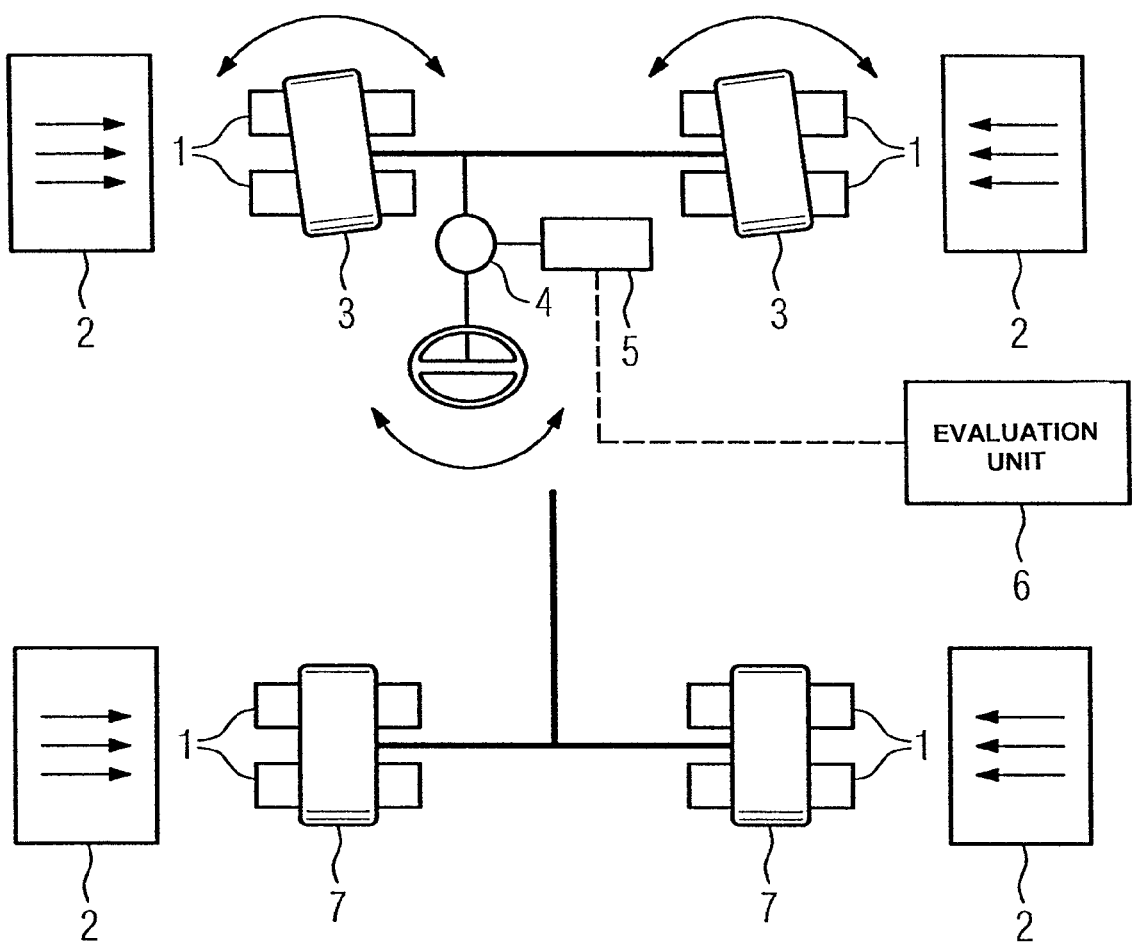
FIG. 1 is a schematic illustration of the test stand in accordance with the invention.

A test stand for a vehicle is illustrated in FIG. 1. The test stand has four pairs of rollers 1 that are each assigned a measuring probe of a measurement system 2 for measuring the position of the vehicle. Resting on two of the pairs of rollers 1 are the front wheels 3 of the vehicle, which in the present exemplary embodiment has an electric steering 4 for a steering system. The steering angle of the front wheels 3 can be varied using a controller 5 connected to the steering system. Since at least one of the two rollers of each pair of rollers 1 for the front wheels 3 can be moved by motor about the longitudinal axis and the associated front wheel can thereby be driven, this permits the position and thus the centering of the vehicle to be varied. In the case of the device for centering the vehicle in accordance with the presently contemplated embodiment, the position of the vehicle is varied in a closed control loop. To this end, the measuring probes are used to measure the actual position, and the measured data are evaluated by an evaluation unit 6. Here, the measuring probes advantageously measure the four wheel house edges in order to determine the position of the vehicle. The result of the evaluation is relayed to the controller 5 which thereupon applies an appropriate steering angle to the steering system 4. The position on the pairs of rollers 1 is thereby varied to the extent that the desired centering of the vehicle is achieved.

With additional reference to FIG. 1, in accordance with the present exemplary embodiment, the rear wheels 7 rest on the two further pairs of rollers 1. In an embodiment, instead of the front wheels 3, the rear wheels 7 can be provided with a steering system. As described above, controllers can be used to vary the steering angle of the rear wheels 7 to also correspondingly undertake centering of the vehicle with the rear wheels 7.

In another embodiment, the front wheel axle and the rear wheel axle are steering axles. Here, the centering of the vehicle with the front wheels 3 and the rear wheels 7 is possible at the same time in accordance with the disclosed embodiments.

Figure 2:
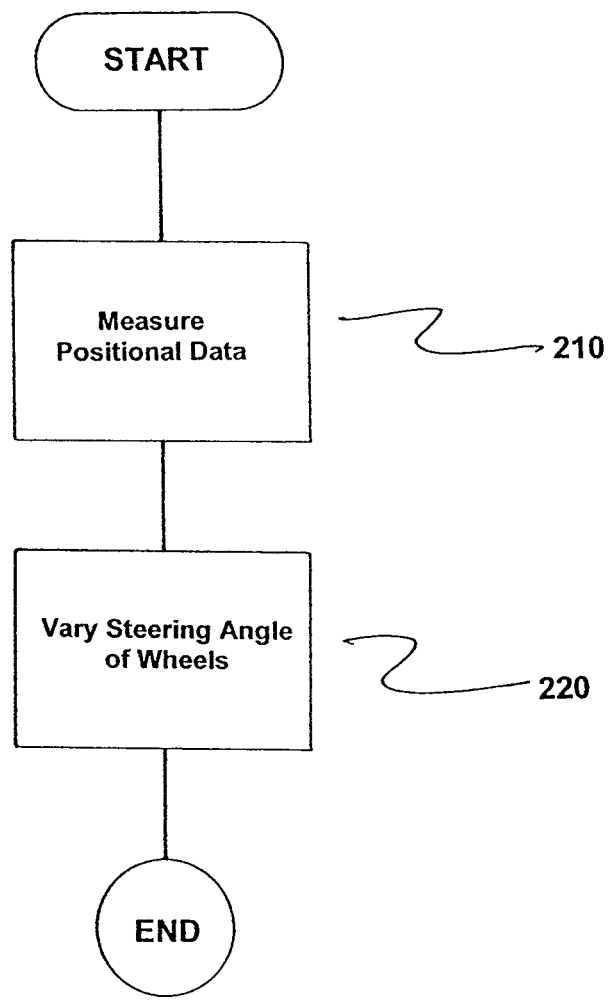
FIG. 2 is a flow chart of the method in accordance with an embodiment of the invention.

FIG. 2 is a flow chart of a method for centering a vehicle in a test stand, where at least one of the front wheels and the rear wheels each rest on a pair of rollers, and one of two rollers of the pair of rollers is moved by a motor about a longitudinal axis. The method comprises measuring, by a measuring system, data relating to a position of the vehicle, as indicated in step 210. Next, a steering angle of at least one of the front wheels and rear wheels is varied by a controller to position the vehicle, the controller being coupled to a steering system of the vehicle, as indicated in step 220.

Thus, while there are shown, described and pointed out fundamental novel features of the invention as applied to preferred embodiments thereof, it will be understood that various omissions and substitutions and changes in the form and details of the illustrated apparatus, and in its operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice.

The invention claimed is:

1. A device for centering a vehicle in a test stand that has at least two pairs of rollers for at least one of front wheels and rear wheels of the vehicle, at least one of the two rollers of each pair of rollers being movable by motor about a longitudinal axis, the device comprising:
  a measurement system for measuring a position of the vehicle; and
  a controller coupled to a steering system of the vehicle, the controller varying a steering angle of at least one of the front wheels and rear wheels of the vehicle as a function of data received from the measurement system to position the vehicle in a center of the test stand.

2. The device as claimed in claim 1, further comprising:
  an evaluation unit configured to evaluate the positional data received from the measurement system, and to forward a result of the evaluation to the controller.

3. The device as claimed in claim 1, wherein the steering system of the vehicle is an electrical steering system.

4. The device as claimed in claim 2, wherein the steering system of the vehicle is an electrical steering system.

5. A method for centering a vehicle in a test stand, at least one of the front wheels and the rear wheels each resting on a pair of rollers, one of two rollers of said pair of rollers being moved by a motor about a longitudinal axis, the method comprising:
  a) measuring, by a measuring system, data relating to a position of the vehicle; and
  b) varying, by a controller, a steering angle of at least one of the front wheels and rear wheels to position the vehicle in a center of the test stand, the controller being coupled to a steering system of the vehicle.

6. The method as claimed in claim 5, wherein the data obtained by the measurement system are evaluated, and wherein the steering angle of at least one of the front wheels and rear wheels is varied by the controller as a function of a result of the evaluation.

* * * * *